(12) United States Patent
Sequeira

(10) Patent No.: US 8,404,755 B2
(45) Date of Patent: *Mar. 26, 2013

(54) POLYESTER COMPOSITION AND METHOD FOR PREPARING ARTICLES BY EXTRUSION BLOW MOLDING

(75) Inventor: Clarence Sequeira, New Milford, CT (US)

(73) Assignee: PepsiCo, Inc., Purchase, NY (US)

( * ) Notice: Subject to any disclaimer, the term of this patent is extended or adjusted under 35 U.S.C. 154(b) by 430 days.

This patent is subject to a terminal disclaimer.

(21) Appl. No.: 12/425,697

(22) Filed: Apr. 17, 2009

(65) Prior Publication Data

US 2009/0264545 A1   Oct. 22, 2009

Related U.S. Application Data

(60) Provisional application No. 61/046,389, filed on Apr. 18, 2008.

(51) Int. Cl.
*C08J 11/04*   (2006.01)

(52) U.S. Cl. ............ 521/48; 521/40; 525/55; 525/191; 525/197; 525/198; 525/228; 528/272; 528/308.1; 528/308.2; 528/308.3; 528/308.6; 264/512; 264/514; 264/515

(58) Field of Classification Search ............ 521/40, 521/40.5, 41, 45.5, 46, 47, 48; 528/271, 528/272, 308.1, 308.2, 308.3, 308.6, 312, 528/480, 481, 502 R, 502 C, 503, 502 F; 264/510, 512, 514; 525/55, 191, 197, 198, 525/222, 228, 418; 422/129, 131, 136, 137, 422/138, 139, 144, 145, 146, 147
See application file for complete search history.

(56) References Cited

U.S. PATENT DOCUMENTS

| 4,132,707 | A | 1/1979 | Borman |
| 4,145,466 | A | 3/1979 | Leslie et al. |
| 4,219,527 | A | 8/1980 | Edelman et al. |
| 4,223,125 | A | 9/1980 | Bier et al. |
| 4,223,128 | A | 9/1980 | Halek et al. |
| 4,554,328 | A | 11/1985 | Sinker et al. |
| 4,629,598 | A | 12/1986 | Thompson |

(Continued)

FOREIGN PATENT DOCUMENTS

| CH | 678184 A5 | 3/1989 |
| DE | 3723758 A1 | 1/1988 |

(Continued)

OTHER PUBLICATIONS

Annex to PCT/ISA/206 for PCT/US2009/040969 dated Jul. 17, 2009.

(Continued)

*Primary Examiner* — Frances Tischler
(74) *Attorney, Agent, or Firm* — Banner & Witcoff, Ltd.

(57) ABSTRACT

Polyester compositions described herein have properties which are particularly suitable for extrusion blow molding (EBM). These properties relate primarily to the rate of crystallization and melt strength or melt viscosity. Articles prepared from the polyester compositions exhibit good clarity, aesthetics, and other physical properties. The polyester compositions also exhibit broad molecular weight distribution (MWD), resulting in improved processability and melt strength. The crystallization rate allows for good drying characteristics while also enabling the use of regrind. In addition, the compositions exhibit improved recyclability, such as in existing PET recycling streams. In one aspect, articles are prepared in an extrusion blow molding method by combining a dry first polyester copolymer component, a dry second polyester component, and a chain extender to form a feed material suitable for extrusion blow molding. In another aspect, a single component co-polyester and a chain extender are combined to form a feed material.

16 Claims, 12 Drawing Sheets

U.S. PATENT DOCUMENTS

| | | | |
|---|---|---|---|
| 4,644,049 A | 2/1987 | Tung et al. |
| 4,814,426 A | 3/1989 | Utsumi et al. |
| 4,880,860 A | 11/1989 | Blocker |
| 4,988,279 A | 1/1991 | Belcher |
| 4,999,388 A | 3/1991 | Okamoto |
| 5,000,991 A | 3/1991 | Hayashi et al. |
| 5,091,459 A | 2/1992 | Howe |
| 5,110,844 A | 5/1992 | Hayashi et al. |
| 5,128,383 A | 7/1992 | Amano et al. |
| 5,134,028 A | 7/1992 | Hayashi et al. |
| 5,137,790 A | 8/1992 | Cox et al. |
| 5,149,485 A | 9/1992 | Belcher |
| 5,229,432 A | 7/1993 | Muschiatti |
| 5,283,295 A | 2/1994 | Light et al. |
| 5,288,764 A | 2/1994 | Rotter et al. |
| 5,310,799 A | 5/1994 | Carson et al. |
| 5,314,987 A | 5/1994 | Kim et al. |
| 5,319,128 A | 6/1994 | Dupont et al. |
| 5,376,735 A | 12/1994 | Sublett |
| 5,436,056 A | 7/1995 | Takiyama et al. |
| 5,508,316 A | 4/1996 | Nakamura et al. |
| 5,756,578 A | 5/1998 | Hanes |
| 6,228,302 B1 | 5/2001 | Al Ghatta |
| 6,245,863 B1 | 6/2001 | Al Ghatta |
| 6,350,822 B1 | 2/2002 | Van Diepen et al. |
| 6,409,949 B1 | 6/2002 | Tanaka et al. |
| 6,447,711 B1 | 9/2002 | Al Ghatta et al. |
| 6,469,078 B1 | 10/2002 | Simon et al. |
| 6,569,991 B2 | 5/2003 | Nichols et al. |
| 6,586,558 B2 | 7/2003 | Schmidt et al. |
| 6,604,848 B2 | 8/2003 | Tanaka et al. |
| 6,632,493 B1 | 10/2003 | Hildebrand, IV et al. |
| 6,803,082 B2 | 10/2004 | Nichols et al. |
| 6,984,694 B2 | 1/2006 | Blasius, Jr. et al. |
| 7,129,317 B2 | 10/2006 | Moore et al. |
| 7,214,742 B2 | 5/2007 | Bolle et al. |
| 7,226,648 B2 | 6/2007 | Al Ghatta et al. |
| 7,294,671 B2 | 11/2007 | Bheda et al. |
| 7,297,755 B2 | 11/2007 | Shelby et al. |
| 2003/0039779 A1 | 2/2003 | Share et al. |
| 2003/0144402 A1 | 7/2003 | Schenck |
| 2006/0043646 A1 | 3/2006 | Kobayashi et al. |
| 2006/0199921 A1* | 9/2006 | Hale et al. | 525/433 |
| 2006/0287479 A1* | 12/2006 | Crawford et al. | 528/302 |
| 2007/0071930 A1 | 3/2007 | Shelby et al. |
| 2007/0173629 A1 | 7/2007 | Shiga et al. |
| 2008/0093777 A1* | 4/2008 | Sequeira et al. | 264/510 |

FOREIGN PATENT DOCUMENTS

| | | |
|---|---|---|
| EP | 0040134 A1 | 11/1981 |
| EP | 0190040 A2 | 8/1986 |
| EP | 0475142 A3 | 3/1992 |
| EP | 0569153 A2 | 11/1993 |
| EP | 0572682 A1 | 12/1993 |
| EP | 1293527 A1 | 3/2003 |
| EP | 1736509 A1 | 12/2006 |
| EP | 1818352 A1 | 8/2007 |
| EP | 1111006 A1 | 10/2007 |
| EP | 1918327 A2 | 5/2008 |
| GB | 1419049 | 12/1975 |
| WO | 9010667 A1 | 9/1990 |
| WO | 9325619 | 12/1993 |
| WO | 9412564 | 6/1994 |
| WO | 9833837 A1 | 8/1998 |

OTHER PUBLICATIONS

Database WPI Week 200636, Thomson Scientific, London, GB: AN 2006-347148 XP002535492 & JP 2006 124451 A (Toyobo KK) May 18, 2006.

Awaja F. et al., "The effect of chain extension on the thermal behaviour and crystallinity of reactive extruded recycled PET", Journal of Thermal Analysis and Calorimetry, Kluwer Academic Publishers, DO, vol. 78, No. 3, Jan. 1, 2004, pp. 865-884.

Rosu, R. F., et al., "Shear rheology and thermal properties of linear and branched poly(ethylene terephthalate) blends" Polymer, Elsevier Science Publishers B.V., GB, vol. 40, No. 21, Oct. 1, 1999, pp. 5891-5898.

Partial European Search Report for EP 07 25 4147, mailed Dec. 4, 2008.

Kumaravel, G. and Jabarin, S.A., "Extrusion Blow Molding of High-Density Polyethylene-Poly (Ethylene Terephthalate) Blends," Advances in Polymer Technology, vol. 15, No. 3, pp. 191-204 (1996).

J.S. Forsythe et al., "Rheological Properties of High Melt Strength Poly (ethylene terephthalate) Formed by Reactive Extrusion," Journal of Applied Polymer Science, vol. 100, 3646-3652 (2002).

"Mechanical Behavior of High Polymers," Interscience Publishers, vol. VI (1948), pp. 267-339.

F. Awaja et al., "Review Recycling of PET," European Polymer Journal 41 (2005) 1453-1477.

Partial European Search Report for EP 07254147 completed Jan. 29, 2009.

* cited by examiner

POLYESTER COMPOSITION AND METHOD FOR PREPARING ARTICLES BY EXTRUSION BLOW MOLDING

CROSS REFERENCE TO RELATED APPLICATION

This application claims priority under 35 U.S.C. §119(e) to U.S. provisional Application No. 61/046,389, filed Apr. 18, 2008, the disclosure of which is hereby incorporated by reference in its entirety.

BACKGROUND

Polymer resins, such as polyethylene terephthalate (PET), are widely used in the packaging industry. PET is a linear, thermoplastic polyester resin. The myriad advantages of PET include toughness, clarity, good barrier properties, lightweight, design flexibility, chemical resistance and good shelf-life performance. Furthermore, PET is environmentally friendly since it can often be recycled. These characteristics of PET make it a popular material in the manufacturing of containers, for example, beverage bottles.

There are a variety of production methodologies to produce PET containers. For example, injection stretch blow molding (ISBM) is commonly used to make PET bottles. Of the various methodologies, one-piece PET containers having an integrated handle (handleware) are commonly formed using extrusion blow molding (EBM). The EBM process includes extruding a polymer resin in a softened state through an annular die to form a molten hollow tube or parison. The molten parison is placed in a hollow blow mold having a cavity corresponding to the desired shape of the container being formed. Air is injected to inflate the parison against the interior walls of the blow mold. Upon contact with the walls, the parison cools rapidly and assumes the shape of the mold.

Polyesters are typically classified by inherent viscosity (I.V.) as a measure of molecular weight. To form beverage bottles, "bottle grade" PET having an I.V. of about 0.72-0.84 dl/g, is typically used. Bottle grade PET has linear polymer chains and by design has a melt viscosity that is low enough to enable a faster injection stretch blow molding step with the least resistance to flow. Bottle grade PETs generally cannot be used in the production of larger handleware containers using EBM because of low melt strength. Melt strength is quantified by measuring melt viscosity at very low shear rates (approaching zero shear rate). Low melt strength hinders the ability to form a suitable parison. If a parison in the molten state has insufficient melt strength, during the EBM process, as the parison is drawn down by its own weight, the parison forms an hour-glass shape or may completely collapse, thereby resulting in the inability to produce a container. As melt strength increases, material distribution in the walls of the resultant container improves, and the process becomes more controllable and repeatable.

To make PET suitable for EBM, high molecular weight PET having an I.V. of 1.0 dl/g or greater as measured by solution viscosity, could be used. For PET resins I.V. is used as a measure of molecular weight. The average molecular weight of a resin reflects the average length of polymer chains present therein. In general, melt strength increases with chain length and, thereby, also increases with molecular weight. However, higher I.V. polymers generally require higher processing temperatures. Higher temperatures may cause the resin to thermally degrade, resulting in more yellowness in containers produced. Moreover, the process window for a high I.V. PET in an EBM process narrows, making it difficult to run a stable extrusion blow molding operation over an extended period. In addition, longer chain lengths are more susceptible to shear and thermal degradation. Higher I.V. resins also tend to be more expensive than bottle grade PET resin commonly used to produce containers, increasing manufacturing cost.

An alternate solution to achieving a desirable melt strength is to use branched PET copolymers. An example is the Eastar Copolyester EB062, manufactured and marketed by Eastman Chemical Company. EB062 is a lightly branched PET copolymer having an I.V. of 0.75 dl/g. Branching effectively increases the melt strength of the resin. The EB062 copolymer also suppresses crystallization, which enables containers to be produced with high clarity, while allowing the resin to be processed at lower temperatures. Lower processing temperatures result in higher melt viscosity which in turn serves to improve process stability in extrusion blow molding.

While these characteristics serve to produce a container having good aesthetics and consumer appeal, they present challenges in terms of PET recyclability. High levels of such copolymers suppress the rate and extent of crystallization to such a level that results in a slow crystallizing resin. Amorphous or such slow crystallizing resins, when added to the PET recycling stream, tend to cause sticking, agglomeration and bridging issues during the drying process. This characteristic is a major impediment to PET recycling and, as a result, makes such PET resins unsuitable for reuse in the PET recycling process. When bottle grade PET and amorphous and/or slow crystallizing PET are combined, the performance of the molten blend of resins may exhibit a reduced rate and extent of crystallization, insufficient melt temperature, and insufficient physical properties such as hardness, tensile and flexural properties. The severity of these undesirable effects typically bears a direct relationship to the percentage of amorphous or slow crystallizing PET content in such melt processed recycled PET. As a result, PET copolymers such as EB062 generally are not recyclable when the concentration in the PET recycle stream exceeds 5% by weight blended with ground-up PET bottle flake.

There remains a need for polyester compositions that are suitable for extrusion blow molding and which are recyclable in PET recycling streams.

SUMMARY

Polyester compositions described herein have properties which are particularly suitable for extrusion blow molding (EBM). These properties relate primarily to the rate of crystallization and melt strength or melt viscosity. Articles prepared from the polyester compositions exhibit good clarity, aesthetics, and other physical properties. The polyester compositions also exhibit broad molecular weight distribution (MWD), resulting in improved processability and melt strength. The crystallization rate allows for good drying characteristics while also enabling the use of regrind. In addition, the compositions exhibit improved recyclability, such that articles prepared from the compositions may be added to existing PET recycling streams.

In one aspect, a dry first polyester copolymer component, a dry second polyester component, and a chain extender are combined to form a feed material suitable for extrusion blow molding (EBM). A branching agent optionally is added to the feed material. The first polyester copolymer, second polyester component, chain extender, and branching agent, if used, may be simultaneously or sequentially combined. The components are combined in a manner to provide sufficient melt strength desirable for EBM processing to form a finished container possessing desirable clarity and PET recyclability.

In another aspect, a process of extrusion blow molding an article comprises combining a dry first polyester copolymer component and a dry second polyester component to form a first combination. A chain extender is added to the first combination to form a feed material suitable for extrusion blow molding. The feed material is fed to an extrusion blow molding machine to form an extruded article.

In another aspect, a single component co-polyester and a chain extender are combined to form a feed material suitable for extrusion blow molding (EBM). A branching agent optionally is added to the feed material. The single component co-polyester, chain extender, and branching agent, if used, may be simultaneously or sequentially combined. The components are combined in a manner to provide sufficient melt strength desirable for EBM processing to form a finished container possessing desirable clarity and PET recyclability.

DETAILED DESCRIPTION

Figure 1A:
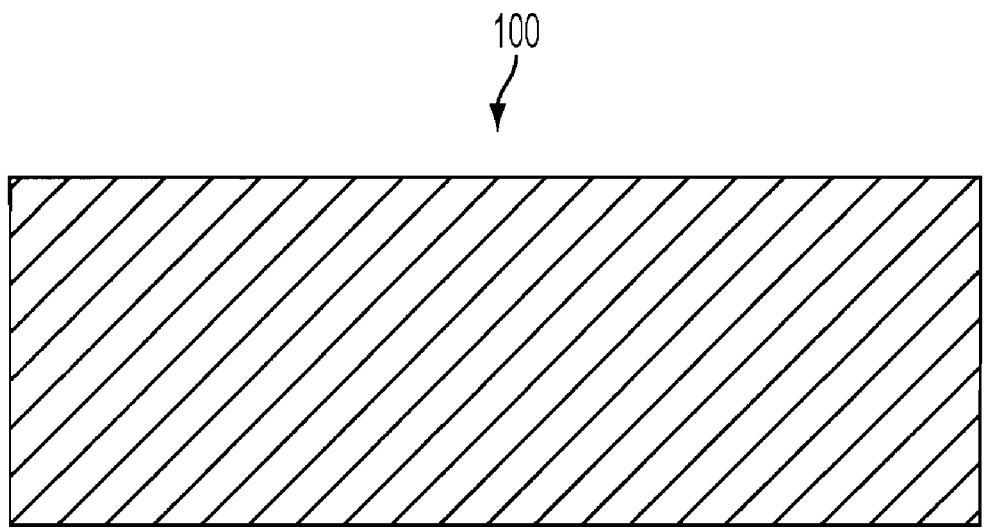
FIGS. 1A-B schematically illustrate structures of polyester compositions.

Polyester compositions can be formulated to have sufficient melt strength to enable their use in an extrusion blow molding (EBM) process. The polyester composition should also be capable of developing sufficient crystallinity upon drying to reduce sticking and agglomeration, making the polymer blend conducive to recycling. Various types of containers can be formed using EBM process, e.g., beverage, food, or non-food containers of various sizes and shapes, including containers from a few ounces up to or greater than 5 gallons, as well as handleware type containers.

Unless otherwise clear from the context, all percentages referred to herein are percentage by weight, based on the total dry weight of the composition.

The term "peak crystallization time," as used herein, refers to the maxima corresponding to the exotherm accompanying crystallization as determined using a DSC, when plotting normalized heat flow (W/g) versus time (min.), for an amorphous quenched polymer held isothermally at 170° C. under nitrogen.

The term "regrind," as used herein, refers to excess or scrap polymeric material that is recovered from the extrusion blow molding process and reintroduced into the extrusion process along with virgin materials. In an EBM process, for example, the source of regrind typically includes tails and moyles (material removed from below and above the article, respectively, as it is formed), scrap articles, and/or other unused or scrap polymeric material. The regrind may be dried and then combined with virgin materials, usually in an amount ranging from 0 to about 90 wt %, often from 0 to about 50 wt %, based on the total weight of the polyester composition.

Articles prepared from the polyester composition should be capable of developing sufficient crystallinity to prevent sticking during drying processes used in PET recycling. For example, the level of the crystallinity that can be developed should be sufficient to reduce sticking, agglomeration and/or bridging issues which can occur during the drying process in the recycling stream. Typically, the level of crystallinity that can developed should range from about 8 to about 40% and higher, usually is greater than about 10% or 12%, and often ranges from about 15 to about 30%. Crystallinity may be determined from effective density by using a density gradient column as described by ASTM 1505.

The first polyester copolymer component is a polyester copolymer that does not show a peak crystallization time of less than about 45 minutes. Usually, the polyester copolymer does not show a peak crystallization time less than about 60 minutes. For example, the first polyester copolymer component may be a lightly branched or unbranched 1,4-cyclohexane-dicarboxylic acid or 1,4-cyclohexanedimethanol modified PET copolyester, or a lightly branched or unbranched polyethylene terephthalate copolymer of isophthalic acid. Such monomers may be used individually or in combination to prepare such copolymers. An example of a branched version of such copolyester is Eastar Copolyester EB062, available from Eastman Chemical Company. EB062 is cyclohexanedimethanol-(CHDM) modified PET copolyester which has an I.V. of about 0.75 dl/g and is a slow crystallizing copolyester material, with a crystallinity of less than 15%, even after heating over extended periods. EB062 has a peak crystallization time of greater than 60 minutes. Other examples of PET copolyesters that do not show a peak crystallization time of less than 45 minutes include Eastar GN046 and Eastar 6763 (CHDM-based), and Invista 8001 (IPA-based). Combinations of copolymers also may be used as the first polyester copolymer, and may be supplied to the compounding extruder either separately or in a combined form.

The second polyester component has a peak crystallization time of less than 45 minutes, usually less than 15 minutes. The second polyester component may be, for example, a bottle grade PET. Generally, bottle grade PET refers to PET with low or no copolymer modification. Such PETs generally possess a faster crystallizing rate. Bottle grade PET often has an I.V. of about 0.72-0.86 dl/g and is commonly used in forming small or regular sized beverage bottles by injection stretch blow molding (ISBM). Various types of bottle grade PET are commercially available, non-limiting examples of which include CB12 and WA314 from Eastman Chemical Company, Laser+ from DAK, Invista 1101, and M&G 8006. Each of these materials has a peak crystallization time of less than 15 minutes. Alternately, the second polyester could be comprised entirely of post consumer recycled PET (PCR).

The second polyester component may comprise combinations of polyester materials. When a combination of polyester materials is used, the materials may be added either separately or in a combined form along with the first polyester copolymer component. For example, plural second polyester components may be pre-blended prior to being combined with the first polyester copolymer component. For example, the second polyester component may comprise bottle grade PET combined with up to 100 wt % recycled polyethylene terephthalate. Examples of other polyester materials include high molecular weight linear or branched PET. High molecular weight generally refers to polyesters having an I.V. greater than 1, usually from about 1.0 to about 1.25 dl/g. Examples of high molecular weight PET resins include DB1 and DB2, available from M&G (Italy), which have an I.V. of about 1.25 dl/g.

The relative amounts of the first polyester copolymer and the second polyester can be selected to achieve the desired melt strength, and a desired rate to achieve a suitable level of crystallinity in the feed material for the extrusion blow molding process. The weight ratio of the first polyester copolymer and the second polyester usually ranges from about 10:90 to about 90:10, often from 25:75 to about 65:35, or from about 40:60 to about 60:40.

While polyester copolymers suitable for use as the first polyester component in carrying out the process of the present invention are normally not considered to be suitable for recycling, because of the difficulties they pose for PET recycling, for example sticking and clumping, it has been discovered that by properly blending such polyester copolymer(s) with the second polyester component as described hereafter, such difficulties can be overcome. As a result, the polyester material recovered from articles produced in accordance with the present invention may be introduced into PET recycling streams at levels of 10% and higher.

An important aspect of the present invention involves improving melt strength of the polyester composition to enable the composition to be used in EBM processes. A chain extender enables a polyester composition to be produced that has a sufficient melt strength for forming a variety of articles by extrusion blow molding (EBM). Chain extenders are typically compounds that are at least di-functional with respect to reactive groups which can react with end groups or functional groups in the polyester to extend the length of the polymer chains. This advantageously increases the average molecular weight of the polyester to improve its melt strength. The degree of chain extension achieved depends on the structure and functionalities of the compounds used. Various compounds are useful as chain extenders. Examples of chain extenders are described in U.S. Pat. No. 4,219,527. Non-limiting examples of chain extenders include trimellitic anhydride, pyromellitic dianhydride (PMDA), trimellitic acid, haloformyl derivatives thereof, or compounds containing multi-functional epoxy (e.g. glycidyl), or oxazoline functional groups. Nanocomposite material such as finely dispersed nanoclay may also be used for controlling viscosity. Commercial chain extenders such as CESA-Extend from Clariant, Joncryl from BASF, or Lotader from Arkema may also be used. The amount of chain extender can vary depending on the type and molecular weight of the polyester components. The amount of chain extender usually ranges from about 0.1 to about 5 wt %, often from about 0.1 to about 0.5 wt %.

The polyester composition also may be modified with branching agents. Branching agents are compounds which have three or more functional groups, and can have low molecular weight. Non-limiting examples of branching agents include pentaerythritol and trimethylolpropane, or other suitable polyols. As with chain extenders, these functional groups can react with the hydroxyl or carboxyl groups in PET to extend chain length and/or create branching or cross-linking. The amount of branching agent can vary depending on the type and molecular weight of the polyester components. The amount of branching agent usually ranges from about 0.01 to about 1 wt %, often from about 0.01 to about 0.1 wt %.

As discussed more fully below, initiating agents that form active radicals upon exposure to irradiation may also be added to the mixture of the first polyester copolymer component and the second polyester component. The active radicals interact with functional groups in the polymer, leading to chain extension and branching.

Figure 1B:
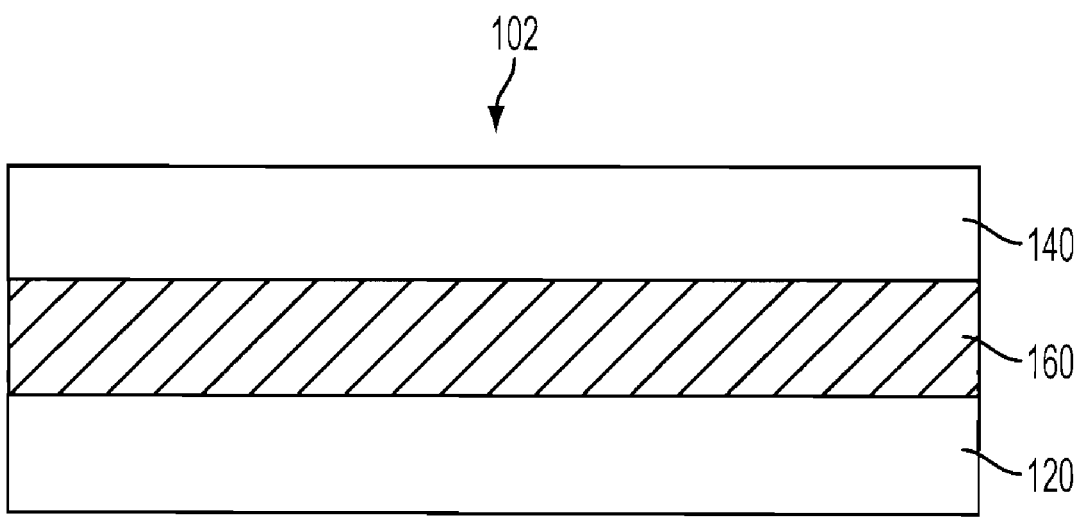
Figure 9:
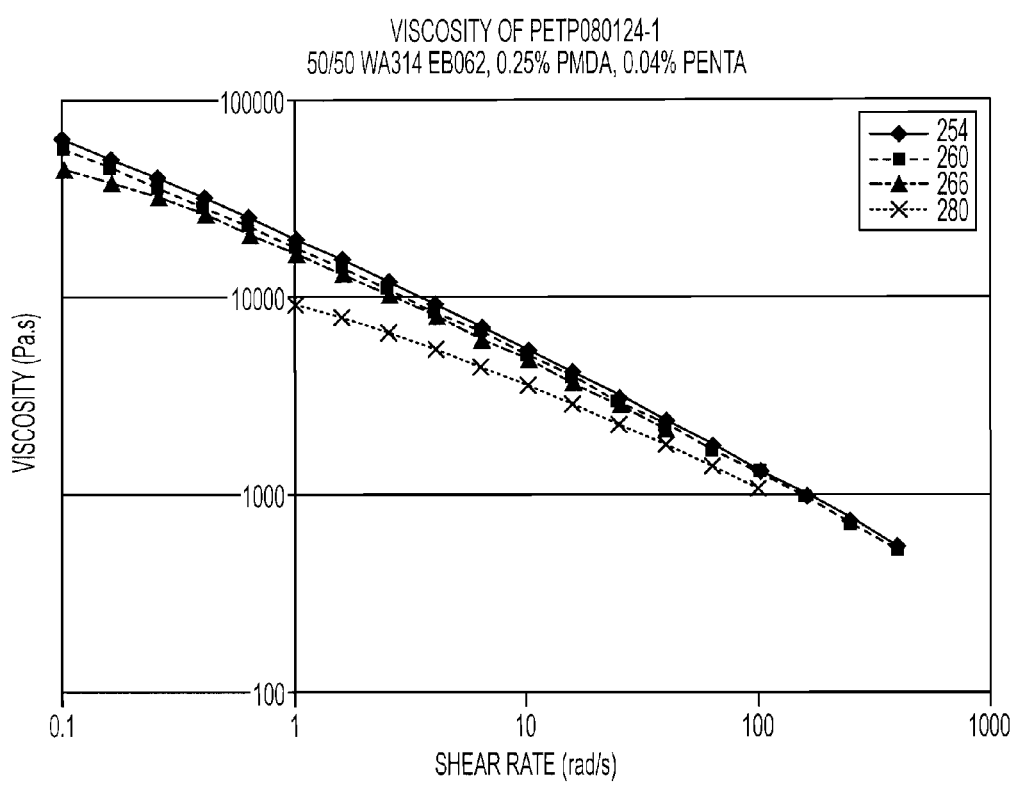
FIG. 9 shows viscosity of a polyester composition as function of shear rate, with viscosity (Pa·s) plotted on the y-axis and shear rate (rad/s) on the x-axis.
Figure 10:
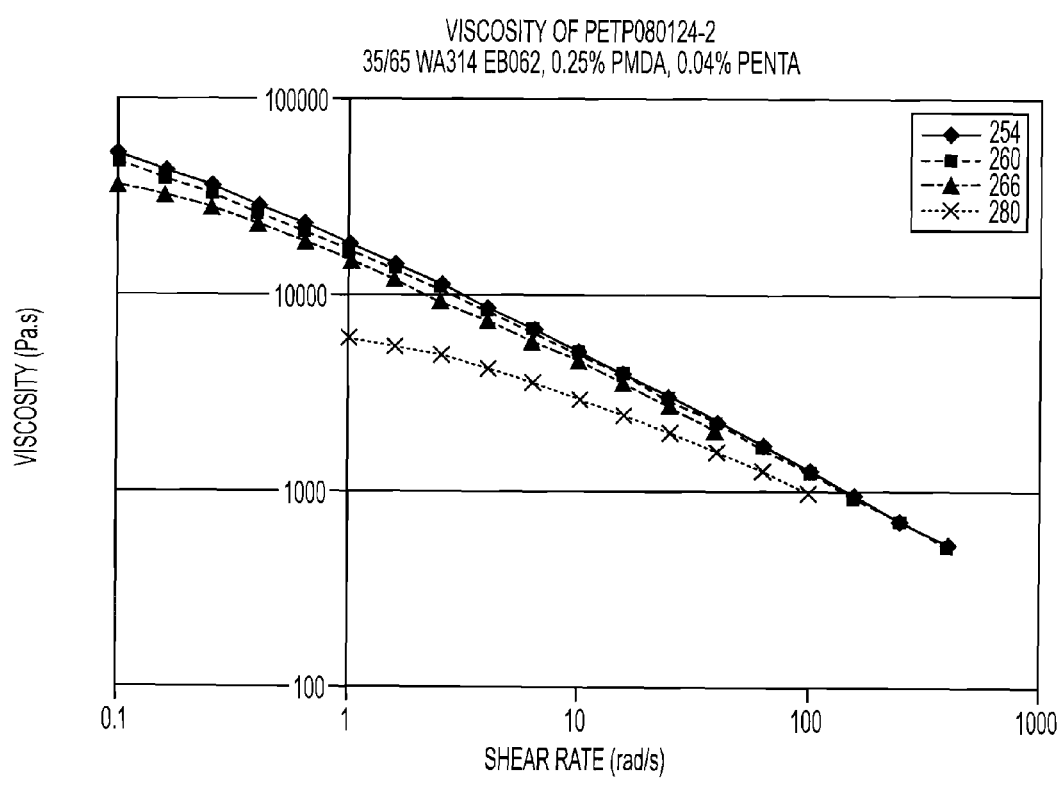
FIG. 10 shows viscosity of another polyester composition as function of shear rate, with viscosity (Pa·s) plotted on the y-axis and shear rate (rad/s) on the x-axis.

FIGS. 1A and 1B illustrate cross sections of articles made by extrusion blow molding from the polyester compositions of the present invention. FIG. 1A illustrates a mono-layer polymer structure 100 made by extrusion blow molding a composition which has a sufficient melt strength for the EBM process. The melt strength usually is at least about 1,500 Pa·s, often is at least about 2,000 Pa·s, and may range from about 10,000 Pa·s to 20,000 Pa·s, at a temperature of at least 390 to 490° F. (199 to 254° C.), examples of which are illustrated in FIGS. 9 and 10. The thickness of the polymer structure may be about, for example, 0.25 to 1.27 mm (10-50 mils). Other thicknesses may also be useful, e.g., depending on the size of the container formed.

FIG. 1B illustrates a multi-layer polymer structure 102. The multi-layer polymer structure has a first layer 120, a second layer 140, and an intermediate layer 160 sandwiched between the first and second layers. The first and second layers can be formed from the same or from different materials. Suitable materials for the first and/or second layers can include, for example, polyester-based polymer or copolymers such as bottle grade PET, high I.V. PET, PETG, branched PET copolymer, or a combination thereof. Other materials having sufficient melt strength for extrusion blow molding can also be used. For example, M&G's (Gruppo Mossi & Ghisolfi, Italy) grades DB1 or DB2 or other types of branched copolyesters can be used. Any of the layers may also include regrind material. One of the first or second layers serves as the inner container wall while the other serves as the outer container wall. The intermediate layer 160 comprises a polymer made by extrusion blow molding a blend containing a first polyester copolymer, a second polyester, and a chain extender as described above with respect to FIG. 1A.

The polyester composition generally has lower copolymer content and higher crystallinity than does the first polyester copolymer alone. By combining the first polyester copolymer and the second polyester components with chain extender, the resulting polyester composition can be extrusion blow molded and such blow molded articles can be recycled. PET recycling streams may contain as much as about 10 wt % or more of the material from such blow molded articles.

The first polyester copolymer and second polyester may be combined by any suitable melt blending technique, such as with a static mixer, or a compounding extruder. The first polyester copolymer, second polyester component, chain extender, and branching agent, if used, may be simultaneously or sequentially combined. Alternately, a single component polyester copolymer, chain extender and branching agent may be simultaneously or sequentially combined by any suitable technique, such as with a static mixer, or a compounding extruder. The components are combined in a manner to provide sufficient melt strength desirable for EBM processing to form a finished container possessing desirable clarity and PET recyclability.

Figure 2:
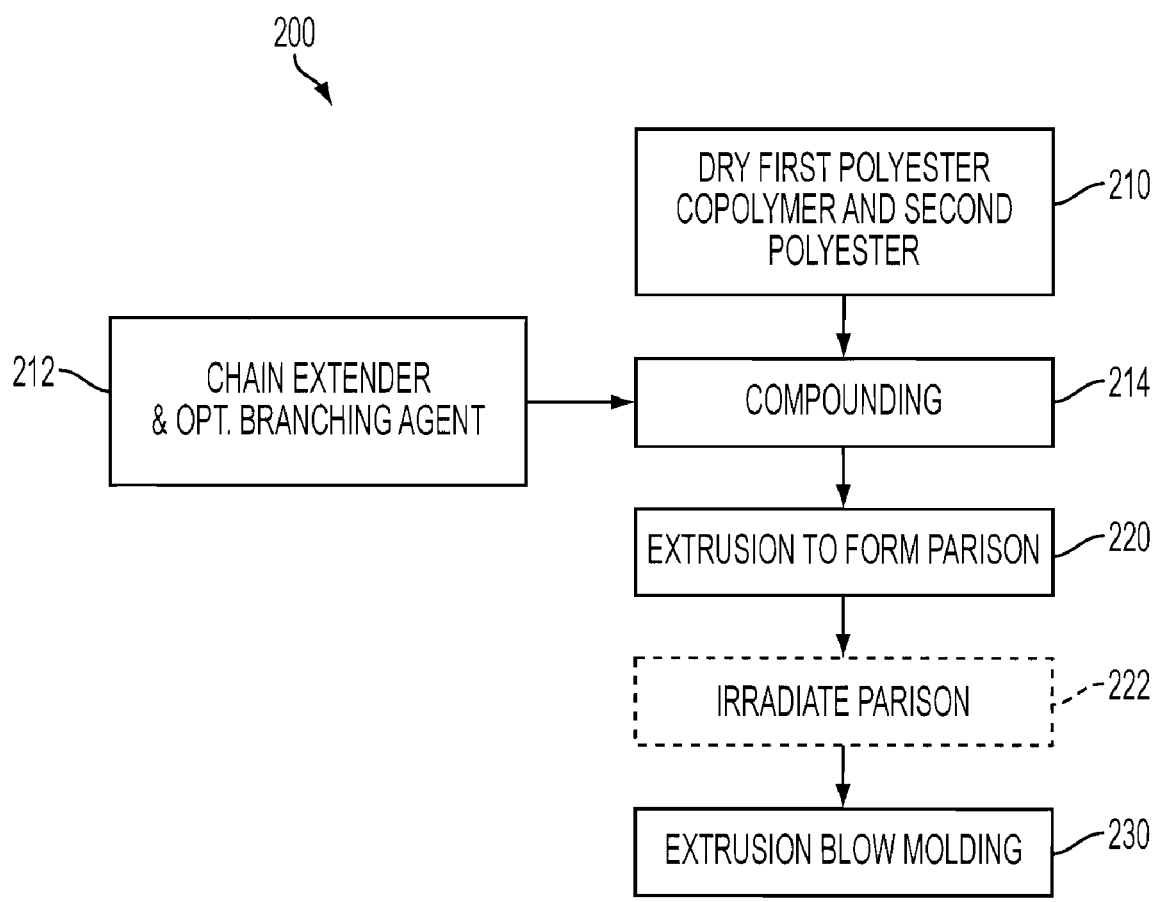
FIG. 2 shows an example of a process flow diagram for extrusion blow molding.

FIG. 2 is a flow diagram showing a process 200 for extrusion blow molding a container. At step 210 the first polyester copolymer and the second polyester component are dried. Each of the polyester components may be provided in the form of flakes or pellets. At step 214 the polyester components are combined in a compounding extruder. Compounding may be accomplished with a twin co-rotating screw extruder with an L/D ratio of at least 20:1, often at least 30:1, with screw elements arranged with three kneading block sections. Examples of such devices include Werner & Pfleider ZSK series extruders made by Coperion Corporation. The screw arrangement may be designed for low to moderate dispersive mixing. The screw may have up to 10 barrel sections. For example, the polyester components may be introduced in barrel 1 and discharged from barrel 9. In such an arrangement, kneading blocks from feed to discharge are located in barrels 3, 5 & 7. Gravimetric or volumetric feeders can be used to control the respective quantities of pellets of the first polyester copolymer and the second polyester fed to the compounding extruder.

The dried polyester components may be added at throat of extruder, with the feed zone temperature set at 560° F. to soften the polyester components being introduced. After the feed zone, the temperature setting is reduced in stages, with the final discharge zone set at 500° F. At illustrated in step 212, a chain extender and optional branching agent may be introduced during the compounding step. For example, a pentaerythritol chain branching agent may be added before the first set of kneading blocks. A PMDA chain extender may be added after the first set of kneading blocks and prior to the second set of kneading blocks. The second kneading section provides gentle kneading action as the polymer is transitioning to a homogeneous melt blend. A final set of kneading blocks before the outlet completes the dispersive mixing. A melt pump may be used to supplement the mixing and ensure positive discharge from the extruder barrel to the die face. A die face is a plate with holes that forms the extrudate into molten strands to be quenched in a water bath. The high viscosity blend exhibits high die swell, which is a measure of the diameter of the extruded strand versus the hole from which the strand exited. The die plate may have a discharge rate of <150 lb/hole. Quenched strands can be pelletized by chopping them into short cylindrical sections.

When compounding and extrusion are performed as separate steps, strand pelletization is advantageous because it does not require the melt temperature to be raised compared to the melt temperature needed to successfully operate underwater pelletizer systems. As will be understood by persons skilled in the art, the reduced temperature requirement and design differences between strand pelletization and an underwater pelletizer system also minimizes the residence time of the polyester composition in the extrusion process. The residence time usually does not exceed 90 seconds. Minimizing residence time in the compounding extruder also allows the quenched polyester composition to retain the ability (developed during the extrusion) to rapidly crystallize on reheating, which in turn enables the polyester composition to be dried with conventional drying equipment before subsequent blow molding extrusion. For example, the quenched, compounded polyester composition typically has a peak crystallization time of less than 60 minutes, often less than 30 minutes. This enables the quenched polyester composition to be dried in a conventional PET desiccant dryer, as described more fully below in connection with FIGS. 3A and 3B. The dried polyester polymer composition may be discharged from the dryer without bridging (plugging the discharge port). The moisture content in the dried polyester composition usually is less than about 100 ppm, often less than 50 ppm, as measured by a TA Instruments moisture analyzer. The compounded polyester composition then may be charged into the main extruder to melt-blend and produce a parison as shown in step 220 for blow molding extrusion.

The pellets formed from the quenched polyester composition are typically dried to the desired low moisture content before being fed to the EBM extruder. Moisture, if present in the pellets, promotes hydrolytic degradation of the linear crystallizable PET chains during extrusion or blow molding, which may result in chain scission and an undesired drop in I.V. Drying can be accomplished by a conventional desiccant dryer. Vacuum drying was also shown to be effective in reducing moisture in resin pellet blends. In addition, a dryer hopper could also be installed at the inlet throat of the extruder to pass hot desiccant air through the pellets before they enter the extruder to ensure maximum dryness. Moisture levels are usually less than about 100 ppm and often are less than about 50 ppm.

The EBM extruder to be used is typically one with a low compression ratio with a barrier section for mixing. For lower speed production (lower output) with longer residence times in the melt, a shorter screw, such as a 24:1 L/D may suffice. For higher speed production with shorter residence times, a longer screw, such as a 30:1 L/D is preferred. For enhanced melt quality in high speed production, extruders may be fitted with melt pumps to supplement melt homogeneity. Upon entering the extruder, the pellets of the polyester composition are heated to above the melting point to soften the polymer, usually above about 220° C. The softened polymer is extruded through a die head to form a hollow tube. In the case of co-extrusion, multiple layers are extruded concurrently through a die head comprising a plurality of concentric, annular dies to form a multi-layer tube. Typically, the tube is extruded between two halves of an open mold. When the tube reaches the proper length, the mold closes, catching and holding the neck end of the tube open and pinching the bottom end closed. The parison is thus formed.

The polyester composition optionally is modified at step 222 by irradiating the parison as it emerges from the extruder die head. Branching of the PET chains can be effected in-situ using electron beam (e-beam) initiating agents compounded into the melts and activating the initiators as the molten parison as it emerges from the extruder die head. This can be accomplished, for example, by exposing the molten parison with e-beam radiation as soon as the melt exits the die head. Irradiation results in the formation of active-radicals, which can react with functional groups in the polymer blend, resulting in branching and consequently higher melt strength.

At step 230, the parison is blow molded to form the container. Here, the parison, in a softened state, is placed in a hollow blow mold having a cavity corresponding to the desired shape of the bottle. Air or other compressed gas is injected to inflate the parison against the interior walls of the blow mold. Upon contact with the walls, the parison cools rapidly and assumes the shape of a bottle. By way of example, the polyester composition may have a melt temperature in the range of 230 to 260° C. and may be blown into a parison using less than 90 psi of blow air.

Figure 3A:
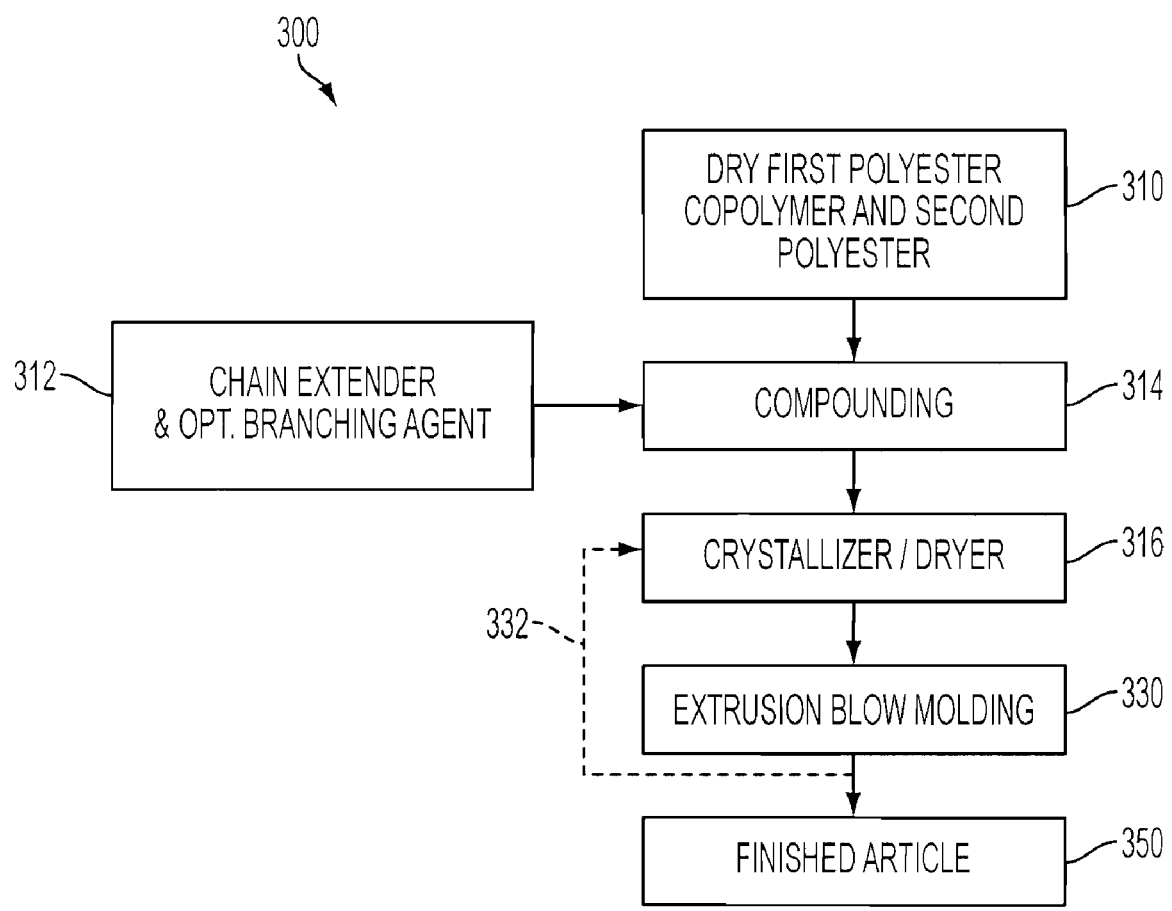
FIG. 3A shows a process flow diagram illustrating the recovery and reintroduction of regrind material.
Figure 3B:
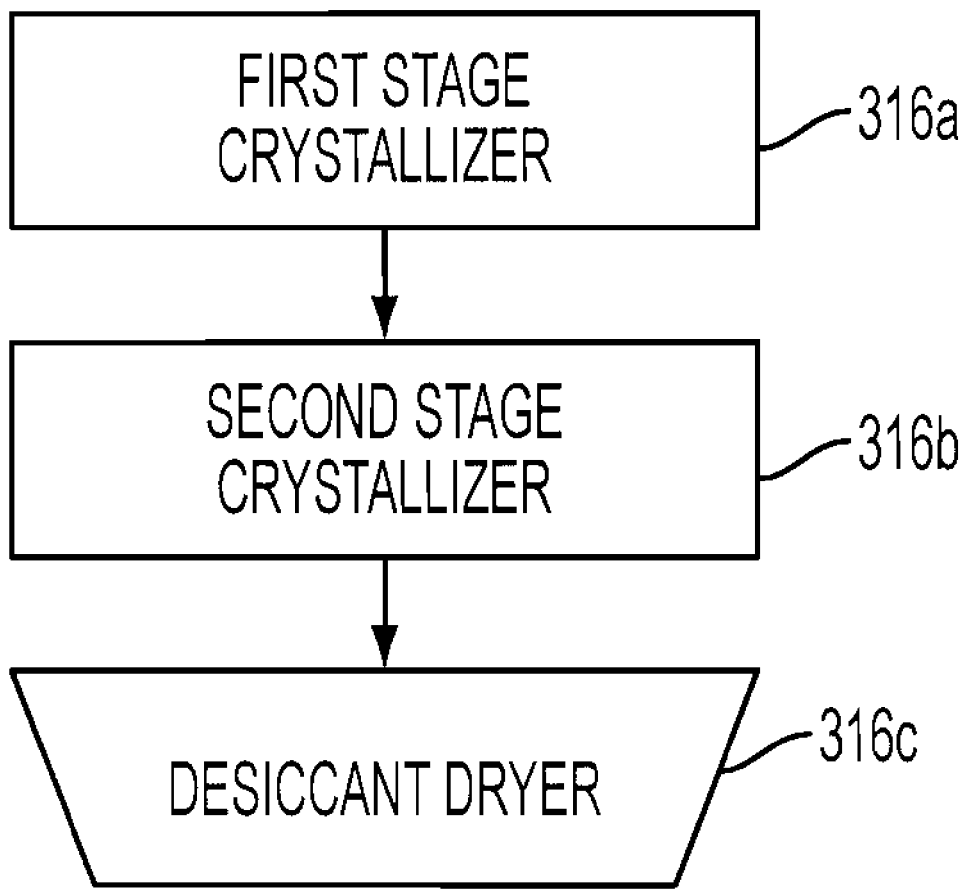
FIG. 3B shows an example of a crystallizing and drying operation.

FIG. 3A shows an example of process 300 for forming an extruded article in which regrind is recovered and reintroduced. In steps 310, 312, and 314, the first polyester copolymer and second polyester materials are dried and compounded along with a chain extender and optional branching agent as discussed above with respect to FIG. 2. In step 316 the polyester composition so-prepared is crystallized and then dried in a desiccant dryer along with the regrind material in 332. As shown in FIG. 3B, the crystallizer/dryer 316 may include first stage 316a and second 316b stage crystallization units and a desiccant dryer 316c. By way of example, the first stage crystallizer 316a may have an average residence time of less than 20 minutes, and the second stage crystallizer 316b may have an average residence time of less than 4 hours. The polyester composition produced in accordance with the present invention is capable of developing sufficient crystallinity to avoid bridging in the dryer. The level of crystallinity developed during the crystallizing/drying step should be at least about 8%, and often is at least about 15%. At step 330, the parison made from the extruded mixture of the polyester composition and regrind material is blow molded to form the container as shown as step 350. Regrind material then is recovered in stream 332 and reintroduced into the crystallizer/dryer at step 316.

Figure 4:
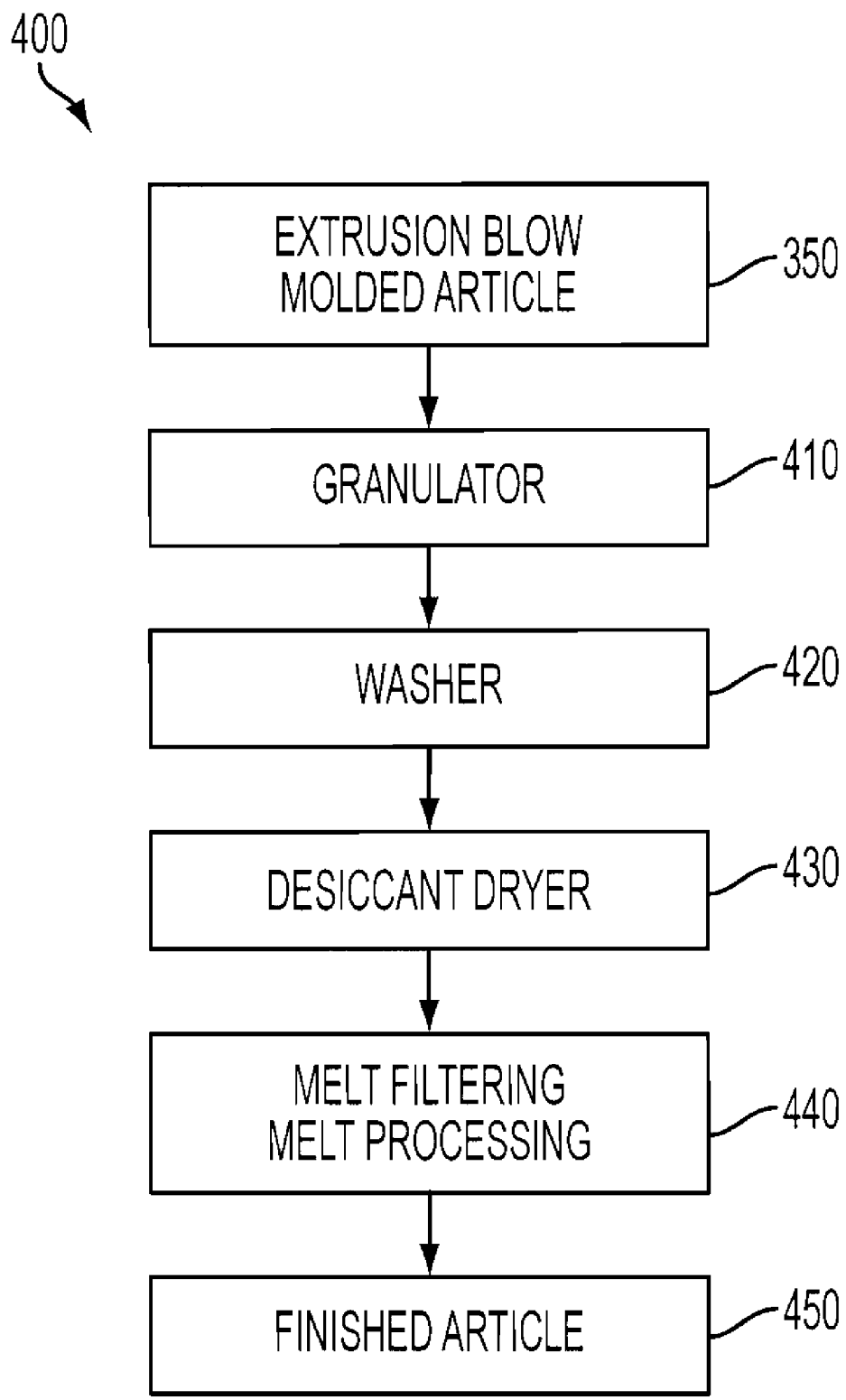
FIG. 4 shows a process flow diagram illustrating PET recycling of extrusion blow molded articles.

FIG. 4 illustrates a typical process 400 for recycling of the extrusion blow molded articles. The articles 350 are collected and fed to a granulator 410, then to a washer 420, and then to a desiccant dryer 430. The material may be combined with other polymeric materials, such as virgin PET and/or PET from carbonated soft drink bottles. The material may then be melt filtered and melt processed in step 440 into finished articles 450. For example, the material may be processed by injection stretch blow molding (ISBM), strapping fibers, and other industrial applications.

The first polyester copolymer component and the second polyester component are capable of undergoing transesterification during extrusion processing. The first and second polyester components are compounded with a chain extender and optionally a branching agent so that the resulting polyester composition has adequate melt strength for extrusion blow molding. The quenched polyester composition also is capable of developing sufficient crystallinity during subsequent processing (e.g., reheating) to render the composition suitable for PET recycling.

Without wanting to be bound by theory, it is believed that a block copolymer is formed with a length of crystalline block units and amorphous block units. The residence time during the second melt processing step (as part of extrusion blow molding) allows transesterification to progress. Transesterification results in the randomization of the crystalline and slower crystallizing domains. The melt strength and crystallization rate properties of the polyester composition may be optimized to meet the requirements for processability, taking into account the sum of the time spent by the resin in the melt. For example, the proportion of crystalline and amorphous components in the polyester composition as well as the total melt process time and temperature may be selected to result in a pellet or chip having a suitable rate and extent of crystallization to allow the extruded pellet to undergo sufficient crystallization to allow for subsequent drying in a conventional desiccant dryer. The crystallization properties enable the polyester composition to be dried to moisture levels many times lower than those possible for amorphous extrudable PET compositions that are commercially available. The polyester composition typically has a peak crystallization time of less than 60 minutes.

A further advantage to the crystallizable polyester composition of the present invention is evident during the next phase of melt processing needed to extrusion blow mold a container. This is where the pellets are heated in an extruder prior to forming the intended article from the molten parison. This is accomplished by setting temperature zones along the extruder barrel to melt the polyester. Amorphous polymers are prone to bridging in the throat of the EBM extruder, as a result the zone settings have to be carefully set so as not to cause the resin to heat up in the extruder throat and cause bridging. A partially crystalline blended formulation offers the unique advantage of allowing higher entry zone temperatures while greatly reducing the chance for bridging or plugging the extruder throat facilitating a more stable and reliable process.

Another advantage is that the polyester composition can be dried at higher temperatures, which enable shorter residence times to achieve the desired moisture levels. For example, the polyester composition may be dried for 6 hours at temperatures in excess of 200° F. to a moisture content of less than 50 ppm.

Without wanting to be bound by theory, it is believed that the extent of transesterification during the second melt history, which is a function of melt time and temperature, allows further randomization of crystalline blocks resulting in a more suppressed rate of crystallization. Nevertheless, the length of the crystalline blocks may be long enough so that the rate of suppressed crystallization does not allow adequate crystallinity to result in haze in the container wall or thickened pinch-off sections. During the process the extruded melt travels through the die head forms the parison and is quenched forming the blown container, generally in a total time of less than one minute.

On the other hand, the crystalline block repeat units are long enough to facilitate the formation of sufficient crystallinity in the drying step of subsequent PET recycling processes. The drying process, which is typically done at 160° C. for four hours, would allow adequate crystallinity to be developed in the ground flake to prevent sticking or clumping at levels of the recycled extrusion blow molded articles of at least 10 wt %, often at least 20 wt % in a recycled PET stream.

The polyester composition as described herein is particularly useful in high-throughput extrusion blow molding machines such as rotary wheels blow molding systems ("wheels extrusion systems"). Wheels systems are typically used with fractional to low-melt index HDPE & PP resins. These polyester compositions have a higher melt viscosity than copolymers such as EB062. Higher speed continuous extrusion blow molding possible with wheel machines favor higher melt viscosities because the parison formed from higher melt strength polymers allows for higher stretching rates that what is possible with EBM shuttle machines. The lower melt strength of the commercial copolymer such as EB062 forces the wheel to operate at speeds (wheel rpm) significantly lower than that of HDPE.

The polyester composition may optionally contain other various additives. The additives should not interfere with the intended properties of the composition and/or articles prepared therefrom. The amount of additive(s) may vary depending on the properties of the additive and the components present in the composition. For example, the amount of additive may range from 0 to about 1 wt %. Non-limiting examples of additives include UV absorbers, slip agents, plasticizers, nanocomposite material such as finely dispersed nanoclay for controlling viscosity, and pigments, which may be used to render an article opaque and/or create texture or other visual effects in an article.

Molecular weight distribution (MWD) is a well known measurement technique in the polymer industry. Gel permeation chromatography is widely used in polymer characterization to study MWD. It is a process whereby a polymer is dissolved in a solvent with good affinity for the selected polymer and passed through a specifically designed bed capable of separating the lower molecular weight species from higher molecular weight analogs. The average molecular weight, typically referred to as $M_n$ (subscript n for number average molecular weight), is calculated as (sum of $n_i*M_i$)/(sum of $n_i$). Similarly, $M_w$ (weight average molecular weight) is calculated as (sum of $n_i*M_i^2$)/(sum of $n_i*M_i$). For branched polymers, $M_z$ (z average molecular weight) is calculated as (sum of $n_i*M_i^3$)/(sum of $n_i*M_i^2$).

Broadness of MWD is an important consideration for stable processing in extrusion blow molding. In general, materials with broader MWD allow for a wider processing window, provide improved parison programmability, and provide a more uniform and repeatable article wall distribution. In addition, materials having broad MWD also may exhibit improved physical properties such as ease of deflashing (trimming). The ratio of $M_z/M_n$ is indicative of the broadness of MWD. In some compositions described herein, the ratio of $M_z/M_n$ is >3.

The polyester composition could contain unreacted anhydride from the chain extender. Upon extrusion melt processing, these unreacted species could react resulting in further branching and higher molecular weights. This increase is measurable as an increase in IV (measure of MW), a higher MWD, and subsequently a higher ratio of $M_z/M_n$. In addition, extrusion blow molding typically uses regrind to make subsequent containers. In such applications, the material experiences 2 or more melt histories. Multiple melt histories would generally result in a loss of properties in polymeric systems. In contrast, these unreacted chain extender groups may further react to form additional branching to repair or undo the damage done by melt processing. This behavior is illustrated by a further increase $M_z/M_n$, e.g., to >8 of the feed material with multiple melt histories. As a result, processability may be retained even when virgin materials are combined with up to about 50% regrind. Furthermore, the performance of the extruded articles is not compromised in terms of physical properties or drop-impact. Solution I.V. and melt I.V. increase from the initial 0.70 and may approach 1.0 after melt processing, even with the use of 50% regrind usage level. Table A below shows solution I.V., melt I.V., $M_n$, $M_w$, $M_z$, $M_z/M_n$, $M_z/M_w$, and apparent shear viscosity for a two-component polyester composition as supplied and as extruded. The last row shows solution I.V., melt I.V. and apparent shear viscosity upon addition of 50% regrind.

It was found the polyester compositions perform exceptionally well when the material making up the formed article has a solution I.V. of about 0.7 to about 1.3. The melt I.V. may be determined by using a parallel plate rheometer such as the Rheometrics RDA III. The melt I.V. of such polyester compositions also may range from about 0.8 to about 1.3.

Compounding as described herein generally results in a branched network with closer branching junction points as compared to PET formulations produced in present commercial melt or solid state polymerization techniques. This is believed to be due to the delayed addition of the chain extender and/or branching agents with compounding, followed by quick extrusion and strand pelletization after the compounding operation. In contrast, reactor produced formulations rely on addition of branching agents during the early stages of polymerization, or when the melt viscosity is low compared to the viscosity as it exits the polymerization reactor to ensure uniform distribution of branching functionalities.

The branched polymer compositions as described herein provide ease of processing, suitable die swell, ease of blow pin penetration of the parison to enable blowing of the container, and ease of subsequent trimming or deflashing. Furthermore, the shorter MW between branch points produces an extrudable PET material that is inherently more impact resistant. The reason is a system with more frequent branch points is able to retain "free volume" better with aging compared to one with fewer branch points or with a greater molecular weight between branch points. Free volume in polymeric systems is a state of disorder that is present upon rapid quenching of an article from a melt. The disorder of polymer chains in the polymer resulting in "free volume" has been shown to impede fracture in polymers. In amorphous polymer systems, free volume gradually decreases as polymer chains rearrange over extended periods of a few months or with exposure to higher temperatures to reduce the entropy of a system. A more frequently branched system avoiding gelation would arrest the reduction of free volume and thus enhance drop impact resistance. This can be demonstrated, for example, using free volume analysis in aging studies.

A hyper-branched system with lower MW between branch points also has desirable apparent shear viscosities, e.g., the apparent viscosity at 260° C. at 0.1 radians/sec may be greater than about 10,000 Pa·s. The system also may exhibit considerable shear thinning at higher shear rates with apparent shear viscosities of less than about 1000 Pa·s, often less than about 700 Pa·s. This results in a material with a higher zero shear viscosity for better melt strength as It exits the extrusion head, coupled with a lower viscosity at higher shear rates, thereby allowing the resin to be advanced (pumped) thought an

TABLE A

Material Properties - EBM Wheel

| Materials | Solution IV (ASTM 4603) | IV (Melt) Rheometrics RDA III | $M_n$ | $M_w$ | $M_z$ | $M_z/M_n$ | $M_z/M_w$ | Viscosity @ 0.1 rad/sec & 260 C.(Pa · s) |
|---|---|---|---|---|---|---|---|---|
| Resin as supplied | 0.85 | 0.98 | 27,099 | 79,008 | 148,577 | 5.48 | 1.88 | 48,879 |
| Wheel EBM | 0.91 | 1.01 | 17,457 | 83,034 | 305,420 | 17.50 | 3.68 | 51,100 |
| Wheel EBM w/50% regrind | 0.99 | 0.93 | | | | | | 20,485 | extruder with less energy and lower heat generation. Lower heat generated in an extruder results in a polymer with less thermal degradation. The two characteristics exhibited both at the high and low end of the shear rate spectrum are highly desirable and advantageous.

Figure 13:
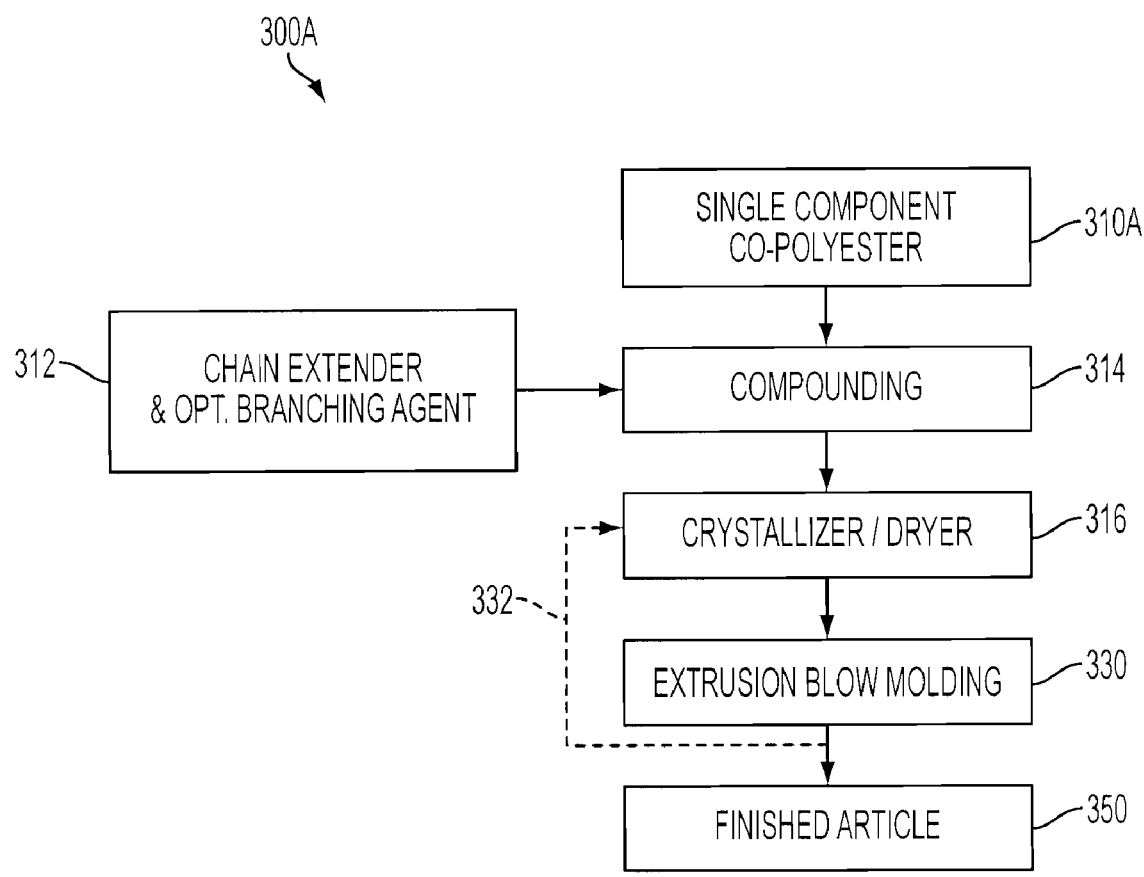
FIG. 13 is an example of a process flow diagram of an extrusion blow molding process using a single component co-polyester feedstock.

As an alternative to combining first and second polyester components as described above, a single component co-polyester having appropriate properties may be used. FIG. 13 shows an example of a flow diagram 300A in which a single component co-polyester 310A is used as feedstock in an extrusion blow molding process. The remaining aspects of the process may be as described above in connection with FIG. 3A. The single component co-polyester may be reactor-produced, e.g., melt processed or solid-stated. The rate of crystallization of the single component co-polyester may be optimized so that formed articles exhibit good clarity while also exhibiting good drying properties, recyclability, and the ability to use regrind, as previously described with respect to the multi-component polyester compositions. Usually, the co-polyester as supplied has a peak crystallization time of less than 45 minutes. After compounding, the peak crystallization time typically is less than about 15 minutes, often less than about 10 minutes. Monomers used to form the co-polyester may be, for example, CHDM or IPA based, or other monomers used commercially in PET production. The level of such monomers may range, for example, from about 5 to about 50 mol %, and often ranges from about 5 to about 30 mol %. It is important for the single component co-polyester to have a isothermal peak crystallization time of less than 45 minutes. The term "single component" is used herein merely for convenience, as this therm does not exclude the presence of additional components, such as additional polyesters or other polymers.

As demonstrated in Table B below, single component co-polyesters may exhibit similar crystallization rates as do the previously described multi-component compositions.

TABLE B

| Sample | Number of Resin Components | Copolymer | Isothermal peak crystallization at 170° C. (minutes) | Percent crystallinity (estimated) |
|---|---|---|---|---|
| 1 | >1 | 14% CHDM | 2.9 | 23.6 |
| 2 | >1 | 14% CHDM | 3.0 | 23.6 |
| 3 | >1 | 27% CHDM | 5.3 | 12.8 |
| 4 | >1 | 27% CHDM | 6.8 | 15.7 |
| 5 | >1 | 32% CHDM | 6.4 | 18.5 |
| 6 | >1 | 32% CHDM | 7.7 | 17.9 |
| 7 | 1 | 10% IPA | 6.1 | 20.3 |
| 8 | 1 | 10% IPA | 6.9 | 20.4 |
| 9 | 1 | 10% IPA | 6.4 | 20.6 |
| 10 | >1 | 16% IPA | 9.1 | 20.0 |

Melt compounding of single component or multi-component polyester compositions with suitable crystallization characteristics using a chain extender, such as pyromellitic dianhydride (PMDA), and optionally a branching agent, such as pentaerythritol, may produce formulations with broad molecular weight distribution (MWD). The compounded formulations may have, for example, a melt viscosity greater than about 15,000 Pa·s measured at 490° F. and 0.1 rad/sec on a Rheometrics RDA III.

The type of distribution is unique to melt compounding and more specifically with a co-rotating twin-screw extruder with suitable kneading elements, and is particularly well suited for EBM processing. Moreover, the quality of melt compounded formulation may be greatly enhanced through the use of a static mixer or extensional flow mixing. Such techniques may be used to incorporate branching and chain extending ingredients, through a process of repeated expansion and contraction of the polymer blend with suitable characteristics. This type of mixing may be accomplished, for example, using Tek-Mix™ technology developed by Stratek Plastic LTD. and supplied by Xaloy as nXmix™. Alternately, extensional flow mixing may be used to augment branching and chain extension of polyester compositions with suitable crystallization characteristics that contains a lower level of branching to a higher more hyper-branched system by a second addition of branching and chain extending components. This approach may reduce the potential for gelation from non-uniform dispersion of reactive components, and may further increase branching between branch points of a branched polymer system. The residence time for the entire mixing operation is typically less than 2 minutes.

The melt compounding approach for producing a reactive extrudable PET (EPET) formulation has advantages uniquely suited to extrusion blow molding (EBM). Reactor-produced, extrudable PET formulations require high viscosities as supplied. This is because the process of melting and extruding the resin melt causes a significant loss of viscosity. Moreover, use of regrind introduces material with two or more melt histories further lowering melt viscosity. This requires feed material to the EBM process to be supplied with a higher initial viscosity to result in an extrudate zero shear viscosity. This additional viscosity would also call for a higher extruder torque or horsepower. Additionally, in the case of highly crystalline EPET formulations, the energy needed to melt the resin is also supplied by the extruder. The end result is with melt or solid state polymerized formulations the extruder output may be lower for a given setup compared to the compounded formulation approach because of the additional energy demands of the respective systems. Additionally, the higher energy needed may have the undesirable effect of raising melt temperature, thereby narrowing the process window. The underlying reason is viscosity of the melt is lower at higher temperatures. The addition of regrind for example (e.g., from Table A), can lower melt viscosity by as much as 60% compared to resin as supplied. The net result is fully-reacted extrudable PET formulations need more energy to process and at the same time has lower viscosities, resulting in a narrower process window. On the other hand, a partially reactive system as described herein has crystallinity of <25% and lower initial viscosity as supplied. The formulation utilizes the time in melt in the EBM extruder to build viscosity, partially undo viscosity losses from shear degradation and the use of regrind, resulting in a system that is easier to process with adequate melt strength. These characteristics provide a unique set of advantages to address the various hurdles of an EBM platform.

EXAMPLES 1-2

Polyester compositions were prepared using Eastman EB062 and Eastman WA314 at 50:50 and 65:35 weight ratios. The polyester components were pre-dried and then compounded with pyromellitic dianhydride (PMDA) and pentaerythritol (Penta) using a 40:1 L/D twin co-rotating screw in the manner previously described. The amounts of each component are summarized in Table 1 below.

TABLE 1

| Example | Total Feed (lb/hr) | WA314 (lb/hr) | EB062 (lb/hr) | PMDA (wt %) | Penta (wt %) |
|---|---|---|---|---|---|
| 1 | 1200 | 600 | 600 | 0.254 | 0.036 |
| 2 | 1200 | 420 | 780 | 0.254 | 0.036 |

Figure 5:
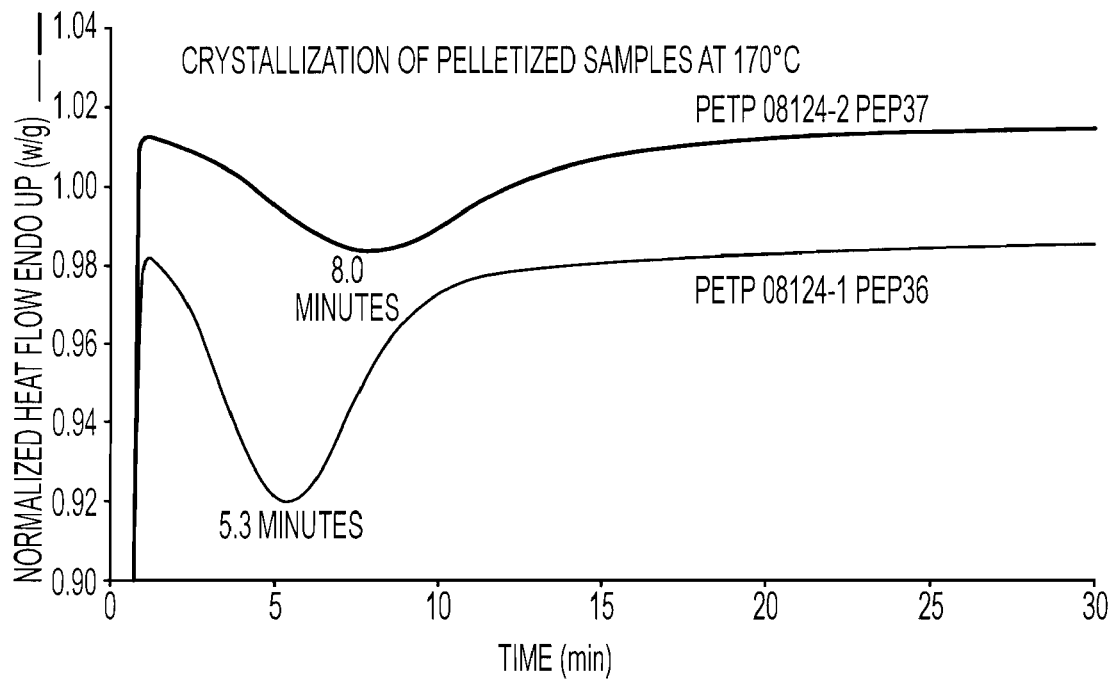
FIG. 5 shows crystallization exotherms of samples during 120 minutes of exposure to 170° C. in a DSC, with normalized endothermic heat flow (W/g) plotted on the y-axis and time (sec.) on the x-axis.

A Perkin-Elmer DSC-7 was used to monitor thermal properties of pelletized samples at heating rates of 10° C. per minute. After being heated to 270° C. and held at this temperature for 0.5 minutes, the materials were quickly cooled to a temperature of 170° C. and held at that temperature for 2 hours. The crystallized samples were then cooled to 40° C. and reheated at 10° C. per minute after their isothermal crystallization cycles. A nitrogen purge was utilized to prevent oxidative degradation. The thermal properties are summarized in Table 2 below. FIG. 5 shows crystallization exotherms during 120 minutes of exposure to 170° C. in a DSC.

TABLE 2

| Example | DSC Treatment | Peak Crystallization Time, min. | *Tg, ° C. | Crystallization Exotherm Peak T (° C.) | Crystallization Exotherm ΔH, J/g | Melting Endotherm Peak T (° C.) | Melting Endotherm ΔH, J/g |
|---|---|---|---|---|---|---|---|
| 1 | Initial Heating | — | 83 | 147 | (−18) | 245, 251 | (18) |
|   | Held at 170° C. for 2 hours** | 5.3 | — | — | — | — | — |
|   | Reheat after Crystallization | — | 83 | — | — | 185, 225, 239 | (18) |
| 2 | Initial Heating | — | 82 | 160 | (−12) | 247, 261 | (12) |
|   | Held at 170° C. for 2 hours** | 8.0 | — | — | — | — | — |
|   | Reheat after Crystallization | — | 84 | — | — | 185, 226, 238 | (12) |

*Glass transition temperature
**Isothermal under nitrogen

Figure 6:
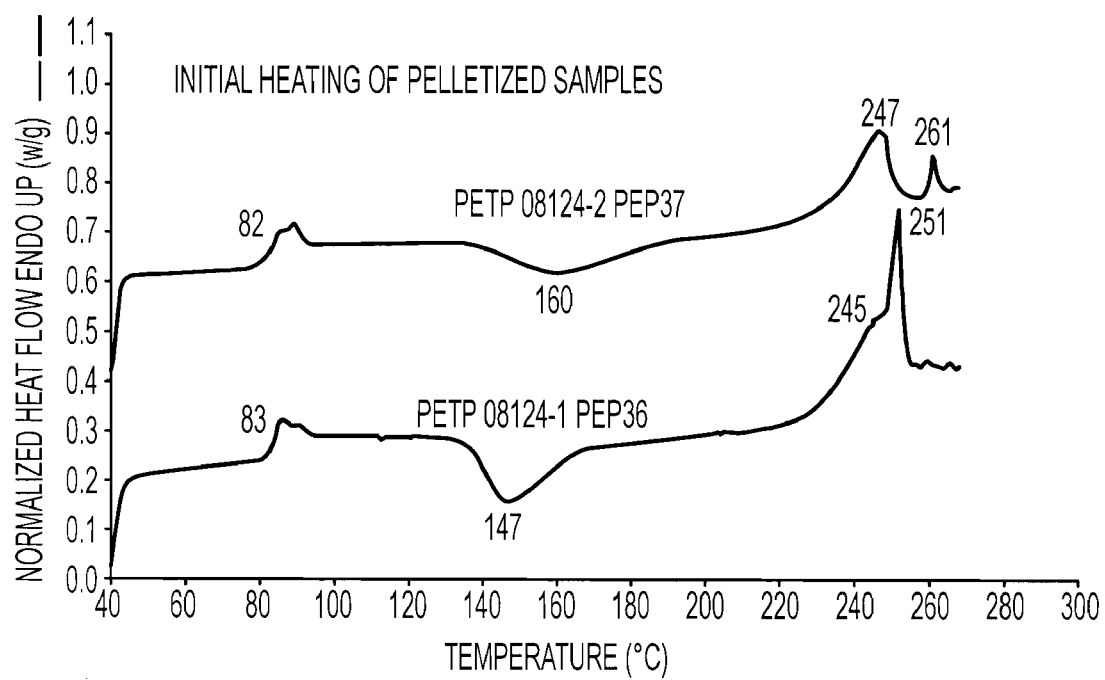
FIG. 6 shows thermal transitions for the pelletized materials when reheated at 10° C. per minute in a DSC after 120 minutes of exposure at 170° C., with normalized endothermic heat flow (W/g) plotted on the y-axis and temperature (° C.) on the x-axis.

FIG. 6 shows thermal transitions for the pelletized materials when heated at 10° C. per minute in a DSC after 120 minutes of exposure to 170° C. The calculated approximate crystallinity for the material of Example 1 was 13% (18/140*100). This is determined by dividing enthalpy by 140, which corresponds to the theoretical enthalpy for fully crystallized PET. This example demonstrates that the materials should develop sufficient crystallinity upon reheating to be processed in PET recycle streams.

Figure 11:
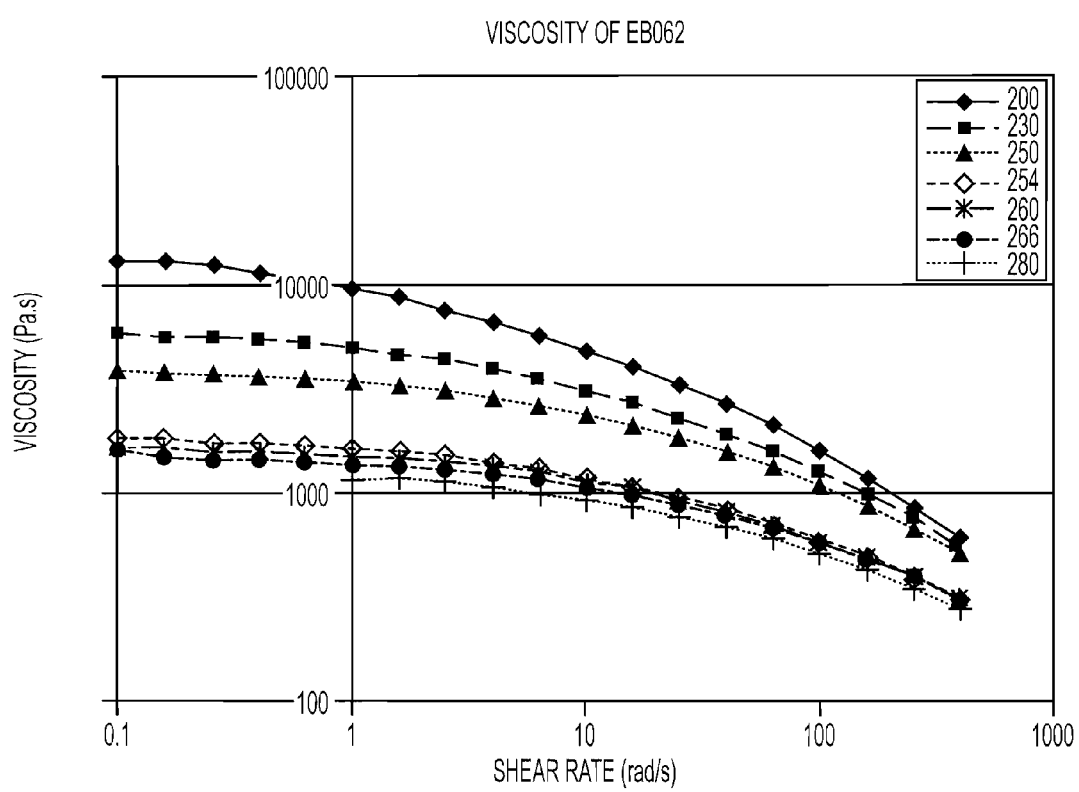
FIG. 11 shows viscosity of EB062 as function of shear rate, with viscosity (Pa·s) plotted on the y-axis and shear rate (rad/s) on the x-axis.

FIGS. 9-11 illustrate viscosity of as function of shear rate for the compositions of Examples 1 and 2 and EB062, respectively. As can be seen in FIGS. 9 and 10, the viscosities of the polyester compositions of Examples 1 and 2 are relatively temperature-independent over the range of 254 to 280° C. In contrast, the viscosity of EB062 (FIG. 11) is lower and significantly more dependent on temperature. The viscosity characteristics of the compositions of Examples 1 and 2 are favorable for facilitating high production speeds.

EXAMPLE 3

Further crystallization studies were conducted on the polyester composition of Example 1 using first stage and second stage crystallizers, Solidaire (SA) and Continuator, respectively, in a Bepex crystallizer unit. The best results were observed using a SA rotor speed of 400 rpm with an exterior jacket temperature of 360° F., product temperature of 250° F., and a throughput rate of 250 lb/hr. The crystallized samples had an average density of 1.31 g/ml with an average crystallinity of 18% within about 2 hours of process time.

EXAMPLE 4

Drying studies also were carried out on the crystallized material of Example 3. The sample was placed in a Conair desiccant dryer. This study shows the material can be dried to 8 ppm moisture in 6 hours at 300° F. The results are summarized in Table 3 below.

TABLE 3

| Run | Set Point (° F.) | Initial $H_2O$ (ppm) | 4 hr $H_2O$ (ppm) | 6 hr $H_2O$ (ppm) | 8 hr $H_2O$ (ppm) |
|---|---|---|---|---|---|
| 1 | 300 | 43 | 56 | 8 | 13 |
| 2 | 287 | 54 | 12 | 10 | 21 |
| 3 | 277 | 241 | 13 | 12 | 24 |
| 4 | 250 | 368 | 13 | 16 | — |

TABLE 3-continued

| Run | Set Point (° F.) | Initial $H_2O$ (ppm) | 4 hr $H_2O$ (ppm) | 6 hr $H_2O$ (ppm) | 8 hr $H_2O$ (ppm) |
|---|---|---|---|---|---|
| 5 | 230 | 354 | 18 | 28 | — |
| 6 | 200 | 246 | 21 | 23 | — |

EXAMPLE 5

Figure 7:
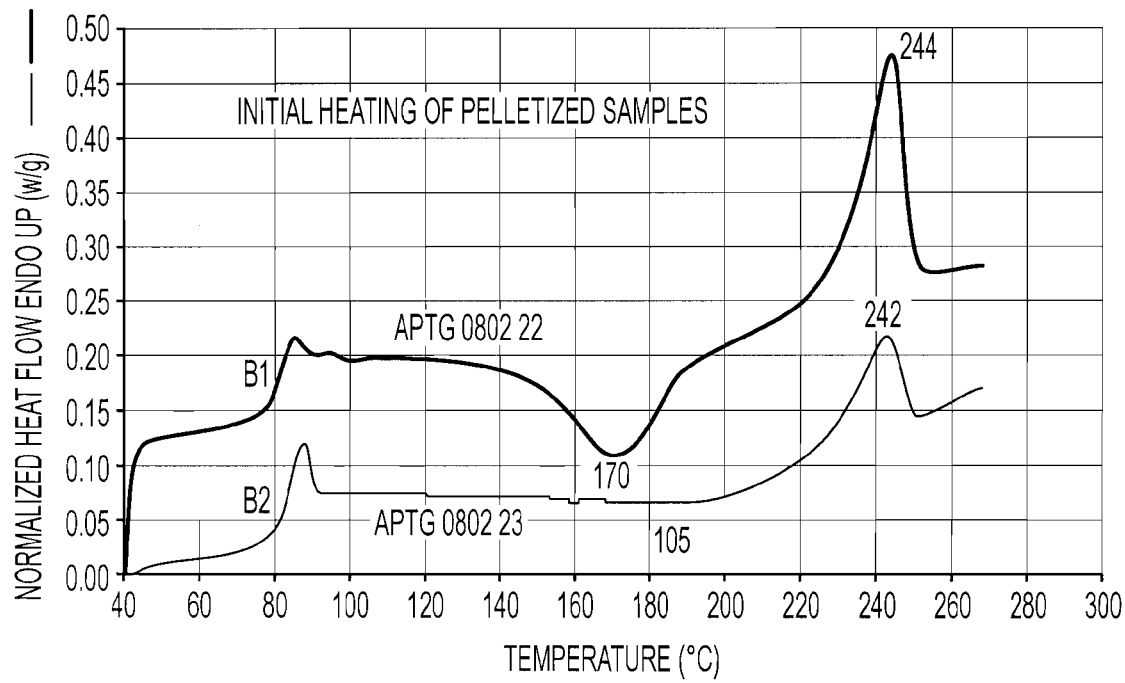
FIG. 7 shows thermal transitions recorded for the initial heating of bottle regrind heated from 40° C. at 10° C. per minute in a DSC, with normalized endothermic heat flow (W/g) plotted on the y-axis and time (sec.) on the x-axis.

Crystallization studies were carried out to illustrate regrind from containers prepared from polyester compositions could be fed back into the extrusion process with starting material after drying. In this case, a 50:50 blend of regrind flake was combined with starting material containing a 50:50 blend of EB062 and WA314. The regrind flake was produced from containers containing a 50:50 blend of EB062 and WA314. Drying was accomplished using Bepex Solidaire (SA) and Continuator units. This study showed that ground bottle flake (regrind) and starting material could be crystallized within about 2 hours of processing without any sticking or agglomeration issues. The mixture of flake and pellets was separated for analysis. Table 4 summarizes the results for the flake portion, and Table 5 summarizes the results for the pellet portion. Density measurements were made by density gradient column. FIG. 7 shows thermal transitions recorded for the initial heating of the crystallized bottle wall materials, heated from 40° C. at 10° C. per minute in a DSC. The results show that the material developed sufficient crystallinity to allow drying in a conventional desiccant dryer.

TABLE 4

(50:50 EB062:WA314, Regrind)

| SA Run Time (min.) | Continuator Run Time (min.) | % Material with white color | Density* (g/ml) | % Crystallinity |
|---|---|---|---|---|
| Feed | N/A | N/A | ≤1.30 | |
| 20 | N/A | 0 | ≤1.30 | |
| 40 | N/A | 0 | ≤1.30 | |
| 60 | N/A | 0 | ≤1.30 | |
| 70 | N/A | 0 | 1.3011 | 10.5 |
| N/A | 0 | 20 | 1.3052 | 12.9 |
| N/A | 25 | 100 | 1.3098 | 15.5 |
| N/A | 40 | 100 | 1.3079 | 14.4 |
| N/A | 60 | 100 | 1.3094 | 15.3 |
| N/A | 80 | 100 | 1.3107 | 16.1 |
| N/A | 100 | 100 | 1.3098 | 15.5 |
| N/A | 120 | 100 | 1.3094 | 15.3 |

*In this test, density grade column was not set up to measure densities below 1.3 g/ml. It is known from previous work densities were in the range of about 1.28.

TABLE 5

(50:50 EB062:WA314, Starting Material Pellets)

| SA Run Time (min.) | Continuator Run Time (min.) | % Material with white color | Density (g/ml) | % Crystallinity |
|---|---|---|---|---|
| 20 | N/A | 100 | 1.311 | 16.2 |
| 40 | N/A | 100 | 1.3136 | 17.7 |
| 60 | N/A | 100 | 1.3136 | 17.7 |
| 70 | N/A | 100 | 1.3117 | 16.6 |
| N/A | 0 | 100 | 1.3136 | 17.7 |
| N/A | 25 | 100 | 1.3116 | 16.6 |
| N/A | 40 | 100 | 1.3156 | 18.9 |
| N/A | 60 | 100 | 1.3142 | 18.1 |
| N/A | 80 | 100 | 1.3143 | 18.2 |
| N/A | 100 | 100 | 1.3109 | 16.2 |
| N/A | 120 | 100 | 1.3131 | 17.5 |

Table 6 shows the percent crystallinity of the 50:50 regrind composition was 27/140=19% while the 75:25 regrind composition developed a crystallinity of 12/140=9%.

TABLE 6

| EB062:WA314 Regrind* | DSC Treatment | Tg, °C. | Crystallization Exotherm Peak T (°C.) | Crystallization Exotherm ΔH, J/g | Melting Endotherm Peak T (°C.) | Melting Endotherm ΔH, J/g |
|---|---|---|---|---|---|---|
| 50:50 | Initial Heating** | 87 | — | — | 174, 241 | (27) |
|  | Reheat 1 | 81 | 177 | (−16) | 239 | (16) |
| 75:25 | Initial Heating** | 86 | — | — | 154, 236 | (12) |
|  | Reheat 1 | 81 | 201 | (−1) | 236 | (1) |

*from Bepex Study as described in Example 5
**initial heating of crystallized samples from Bepex process Table 6 shows the calculated approximate percent crystallinity of the regrind from Example 5. In addition, a second regrind sample (75:25 EB062:WA314) was also processed under the same conditions as Example 5, and it developed an approximate crystallinity of about 9%.

Figure 8:
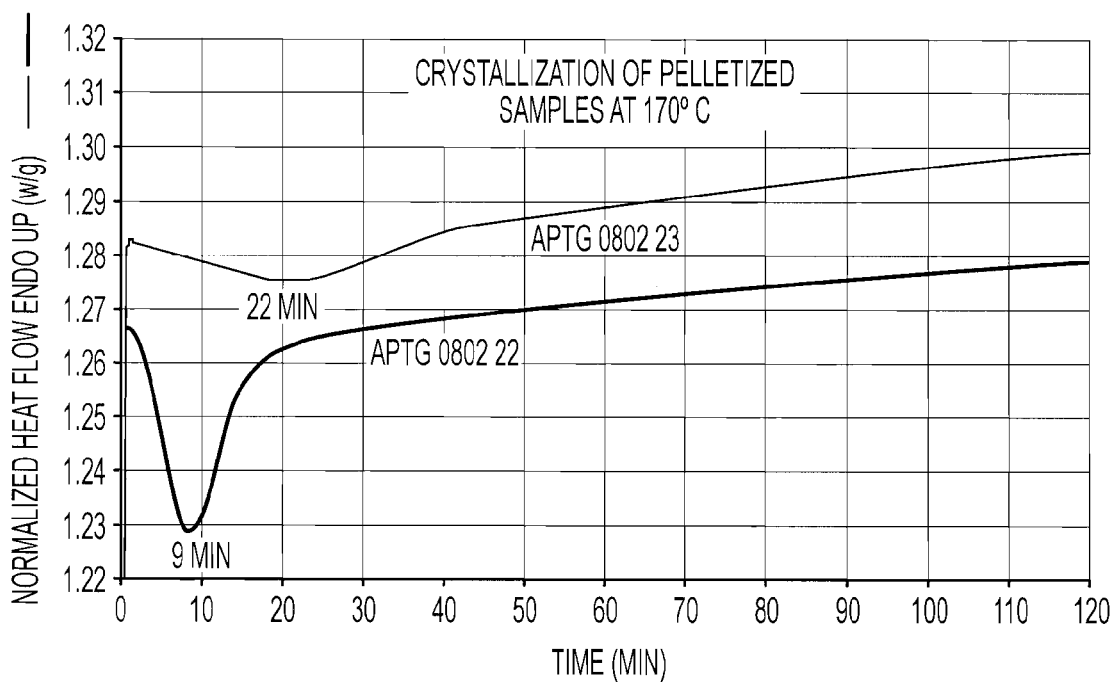
FIG. 8 shows crystallization exotherms of pelletized regrind samples during 120 minutes of exposure at 170° C. in a DSC, with normalized endothermic heat flow (W/g) plotted on the y-axis and temperature (° C.) on the x-axis.

Table 7 shows the results of isothermal studies, conducted on the starting material used to make the containers as described in Table 6. The maximum calculated approximate crystallinity from melt enthalpy with 2 hours at 170° C. was 19/140=13.6% for the 50:50 regrind composition, and 10/140=7% for the 75:25 regrind composition. FIG. 8 shows crystallization exotherms of pelletized regrind samples during 120 minutes of exposure to 170° C. in a DSC.

TABLE 7

| EB062:WA314 | DSC Treatment | Peak Crystallization Time, min. | Tg, °C. | Crystallization Exotherm Peak T (°C.) | Crystallization Exotherm ΔH, J/g | Melting Endotherm Peak T (°C.) | Melting Endotherm ΔH, J/g |
|---|---|---|---|---|---|---|---|
| 50:50 | Initial Heating | — | 81 | 170 | (−17) | 244 | (17) |
|  | Crystallization at 170° C. | 9 | — | — | — | — | — |
|  | Reheat after Crystallization | — | 84 | — | — | 185, 225, 237 | (19) |
| 75:25 | Initial Heating | — | 82 | 195 | (−5) | 242 | (7) |
|  | Crystallization at 170° C. | 22 | — | — | — | — | — |
|  | Reheat after Crystallization | — | 83 | — | — | 185, 224, 236 | (10) |

EXAMPLE 6

This example illustrates the recyclability of articles made from the composition of Example 1. Flakes were provided from containers made from the composition of Example 1 as well as post-consumer recycled PET (RPET). The materials were washed, dried, and pelletized.

To simulate a recycle wash, the flakes from the ground up containers of Example 1 and RPET were washed separately in a caustic wash of 1% NaOH and 0.3% Triton X-100 (surfactant) at 85° C. for 15 minutes. The liquid to solids ratio was 4:1 by weight and an agitator was used at 880 rpm. These conditions represent a standard wash process used to remove dirt and label adhesive during the typical reclamation process. The washed flake from the two lots were rinsed, processed in a sink-float tank for removal of low density contaminants, and later dried (separately) at 65° C. Blends were prepared of 5, 10, 15, and 25% of flakes from washed ground up containers of Example 1 with RPET.

Flake blends weighing 20 lbs were mixed thoroughly and placed in a desiccant oven and dried at 160° C./320° F. for four (4) hours with compression top load of 175 lbs/1.215 lbs/in² to simulate a commercial system with a full dryer. Dried samples were carefully screened for agglomerates greater than ¾ in. in diameter. The results showed flake blends up to 50% had no significant agglomeration. This simulation was designed to demonstrate these materials could be easily discharged from a dryer through a 2 in. discharge line. By comparison, similar blends made with up to 10% EB062 produced significant clumping (greater than ¾ in.). Moreover, clumps from these materials could not be easily crushed.

A test was conducted to examine the effect of washed container flake from Example 1 upon extrusion with bottle resin to examine the suppression of melting point of the compounded blend. Samples were produced as shown below
PFE 001: 100% Control Pellet (Invista 1101)
PFE 002: 75% Control Pellet and 25% washed container flake
PFE 003: 50% Control Pellet and 50% washed container flake The solution I.V. is shown below in Table 8.

TABLE 8

| Amorphous Pellet (1st Heat History) | | |
|---|---|---|
| PFE 001 | PFE 002 | PFE 003 |
| 0% | 25% | 50% |
| 0.745 | 0.757 | 0.751 |

DSC Analysis on the samples showed the characteristics listed in Table 9 below.

TABLE 9

| Sample | DSC Treatment | Tg, °C. | Crystallization Exotherm | | Melting Endotherm | |
|---|---|---|---|---|---|---|
| | | | Peak Temp, °C. | ΔH, J/g | Peak Temp, °C. | ΔH, J/g |
| PFE 001 100% RPET | Initial Heating | 82 | 138 | (−28) | 249 | (31) |
| | Reheat 1 | 78 | 135 | (−24) | 246 | (35) |
| PFE 002 75% RPET | Initial Heating | 82 | 147 | (−29) | 250 | (31) |
| | Reheat 1 | 79 | 146 | (−30) | 245 | (30) |

TABLE 9-continued

| Sample | DSC Treatment | Tg, °C. | Crystallization Exotherm | | Melting Endotherm | |
|---|---|---|---|---|---|---|
| | | | Peak Temp, °C. | ΔH, J/g | Peak Temp, °C. | ΔH, J/g |
| PFE 003 50% RPET | Initial Heating | 82 | 150 | (−27) | 246 | (27) |
| | Reheat 1 | 79 | 153 | (−26) | 244 | (26) |

Figure 12:
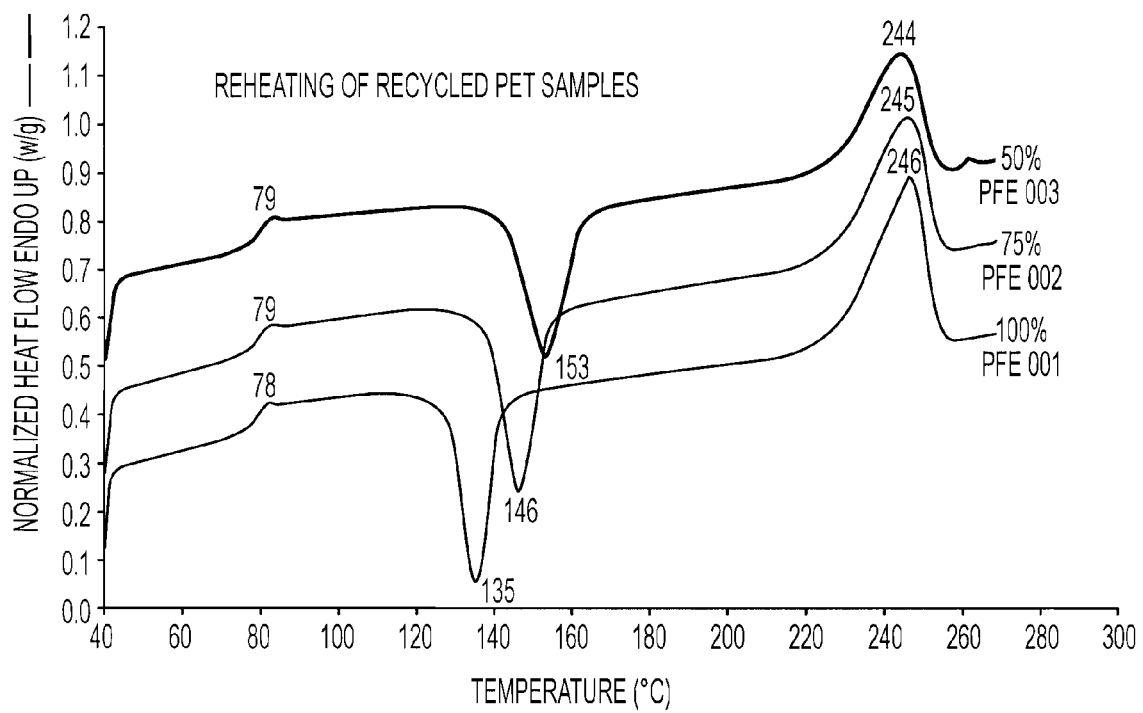
FIG. 12 shows thermal transitions for the first reheating of pelletized samples taken from bottles, heated from the amorphous state at 10° C. per minute in a DSC, with normalized endothermic heat flow (W/g) plotted on the y-axis and temperature (° C.) on the x-axis.

Each of the blends had a sharp melting point on the first reheat at 246, 245 and 244. The data also shows each of the blends has a pronounced crystallization exotherm at 135, 146, and 153° C. respectively with crystallization exotherms >20 J/g. FIG. 12 shows thermal transitions recorded for the first reheating of the pelletized samples heated from the amorphous state at 10° C. per minute in a DSC. This exercise shows that washed flake made from the material of Example 1, melt extruded with up to 50% of the control material, had no significant suppression of the melt temperature or crystallization characteristics.

EXAMPLE 7

This example illustrates that bottles extrusion blow molded from polyester compositions containing 50:50 and 75:25 blends of EB062:WA314 can exhibit good clarity. It is desirable to achieve haze values of 12% or less, especially 10% or less, as measured at 30 mil wall thickness using a Hunter Color Quest XE per ASTM D 1003-7, D65/10. Table 10 below shows haze values for container wall sections.

TABLE 10

| Composition EB062:WA314 | Average Wall Thickness (mils) | Haze (%) D65/10 |
|---|---|---|
| 100:0 (control) | 31.2 | 2.9 |
| 50:50 | 30.5 | 4.6 |
| 50:50 | 28.2 | 8.3 |
| 75:25 | 21.5 | 7.3 |

The foregoing description should be considered illustrative rather than limiting. It should be recognized that various modifications can be made without departing from the spirit or scope of the invention as described and claimed herein.

What is claimed:

1. A process of extrusion blow molding an article comprising:
providing a feed material suitable for extrusion blow molding, the feed material consisting essentially of a dry first polyester copolymer component, a dry second polyester component, a chain extender, and optionally a branching agent, wherein the chain extender is selected from the group consisting of trimellitic anhydride, pyromellitic dianhydride, trimellitic acid, or haloformyl derivatives thereof, and the second polyester comprises up to 100 wt % recycled polyethylene terephthalate;
feeding the feed material to an extrusion blow molding machine to form an extruded article; and
recovering excess material from the extrusion blow molding process as regrind material and combining the regrind material with the feed material.

2. The process of claim 1 wherein the regrind material is combined in an amount up to about 90 wt % based on the total weight of the feed material.

3. The process of claim 2 wherein the regrind material is combined in an amount up to about 50 wt % based on the total weight of the feed material.

4. The process of claim 1 wherein the first polyester copolymer comprises an unbranched or lightly branched polyethylene terephthalate copolymer of 1,4-cyclohexane-dicarboxylic acid, 1,4-cyclohexanedimethanol, isophthalic acid, or combinations thereof.

5. The process of claim 1 wherein the second polyester comprises polyethylene terephthalate.

6. The process of claim 1 further comprising adding a branching agent to the feed material.

7. The process of claim 6 wherein the branching agent is selected from the group consisting of pentaerythritol, trimethylolpropane, and combinations thereof.

8. The process of claim 1 wherein the feed material suitable for extrusion blow molding has a peak crystallization time of less than 60 minutes and at least 8% crystallinity.

9. The process of claim 1 wherein the feed material is produced by combining the dry first polyester copolymer component and a dry second polyester component in an extruder.

10. The process of claim 9 wherein the feed material suitable for extrusion blow molding has a moisture content of less than about 100 ppm.

11. The process of claim 9 wherein the extruder has at least two rotating screws.

12. The process of claim 11 wherein the at least two rotating screws are co-rotating screws, and wherein the extruder further comprises at least three sets of kneading blocks.

13. The process of claim 12 wherein the extruder has an L/D ratio of at least 20:1.

14. The process of claim 1 wherein the feed material suitable for extrusion blow molding has a zero shear viscosity of at least 4,000 Pa·s at a temperature of at least 490 ° F.

15. The process of claim 14 wherein the zero shear viscosity is at least 10,000 Pa·s at a temperature of at least 490 ° F.

16. The process of claim 15 wherein the zero shear viscosity is at least 20,000 Pa·s at a temperature of at least 490 ° F.

* * * * *